United States Patent [19]

Stroman

[11] Patent Number: 5,026,982

[45] Date of Patent: Jun. 25, 1991

[54] METHOD AND APPARATUS FOR INSPECTING PRODUCE BY CONSTRUCTING A 3-DIMENSIONAL IMAGE THEREOF

[76] Inventor: Richard Stroman, 2214 Humbolt Ave., Davis, Calif. 95616

[21] Appl. No.: 416,854

[22] Filed: Oct. 3, 1989

[51] Int. Cl.[5] .................. G01N 9/04

[52] U.S. Cl. .................. 250/223 R; 250/221

[58] Field of Search .................. 250/560, 221, 222.1, 250/223 R; 209/588

[56] References Cited

U.S. PATENT DOCUMENTS

| | | | |
|---|---|---|---|
| 3,005,549 | 10/1961 | Flanders et al. . | |
| 3,275,136 | 9/1966 | Allen et al. . | |
| 3,385,434 | 5/1968 | Nelson . | |
| 3,467,254 | 9/1969 | Simmons . | |
| 3,768,645 | 10/1973 | Conway et al. . | |
| 3,930,994 | 1/1976 | Conway et al. . | |
| 4,279,346 | 7/1981 | McClure et al. | 250/223 R |
| 4,534,470 | 8/1985 | Mills . | |
| 4,555,633 | 11/1985 | Björkelund | 250/560 |
| 4,666,045 | 5/1987 | Gillespie et al. . | |
| 4,825,068 | 4/1989 | Suzuki et al. | 250/223 R |

*Primary Examiner*—David C. Nelms
*Assistant Examiner*—Khaled Shami
*Attorney, Agent, or Firm*—John P. O'Banion

[57] ABSTRACT

A method and apparatus for non-destructive internal and external inspection of produce, including the detection of pits in various stone fruits. The apparatus transmits a first plurality of beams of light (20) across inspection zone (14) and transmits a second plurality of beams of light (30) across inspection zone (14) in a direction transverse to beams of light (20), thus forming an X-Y plane. As article of produce (10) passes through inspection zone (14) along the Z-axis, a first plurality of sensors (24) and a second plurality of sensors (34) detect the variations in the intensity of the beams of light and the data is processed to produce a three-dimensional "picture" of the article of produce. Size, symmetry, external defects, and internal structure are determined as a result of processing the data collected. The apparatus and method can be used for detecting pits or surface defects, and for sorting or rejecting articles of produce based on size, symmetry, external defects or internal structure.

22 Claims, 7 Drawing Sheets

CURRENT TO VOLTAGE CONVERTERS
CURRENT TO VOLTAGE CONVERTERS
DATA IN
DATA IN
DATA OUT
MUX
ENABLE
ADDRESS
ADDRESS
ENABLE
DEMUX
DATA OUT
DATA OUT
TRANSMITTER DRIVER
TRANSMITTER DRIVER
CURRENT MODULATOR
A / D
CONTROL UNIT / PROCESSOR
+V
OV
+
−
10
12
14
44
46
47
48
50
52
54
56
58
60
62
64
66
68
70
72
74
76
78
80
82
84
86
88
90
92
94
96
98
100
102
104
106
108
110
112
114
116
118
120

METHOD AND APPARATUS FOR INSPECTING PRODUCE BY CONSTRUCTING A 3-DIMENSIONAL IMAGE THEREOF

BACKGROUND OF THE INVENTION

This invention pertains to the non-destructive internal and external inspection of produce, including the detection of pits in various stone fruits.

In the area of food processing and production, most stone fruit (peaches, apricots, cherries, prunes, dates and olives) are mechanically pitted. With the mechanical means available today, complete pit removal does not always occur. Often pits or pit fragments remain in the fruit after they have been through the mechanical pitting device and go undetected through the remainder of the processing stage. This could result in damage to equipment or an unwanted pit in the end product resulting in injury or death to persons.

The problem of pit detection has plagued food processors for many years and has resulted in the expenditure of large amounts of money in the replacement of equipment (slicers, dicers, etc.) which have been destroyed due to undetected pits and fragments. With regard to undetected pits in the end product, processors and insurance companies have faced the problem of product liability claims from injuries to the consumer. As a result, the industry has sought accurate and reliable means to detect and reject fruit which still contains pits or pit fragments after the fruit is mechanically pitted. The industry has also sought ways to reject fruit which contains internal damage, has external diseases or blemishes, or which does not meet specific size and shape requirements.

Several types of automated devices have been developed to address certain aspects of these needs. For example, U.S. Pat. No. 3,467,254 issued to Simmons on Sept. 16, 1969, describes an apparatus for detecting pits or remnants in split peaches. U.S. Pat. No. 3,005,549 issued to Flanders et al. on Oct. 24, 1961, describes peach pit fragmentation detection means and techniques for peach halves. Both of these inventions require the fruit to be split in half before inspection, and further require specific orientation of the fruit in the apparatus. These inventions are directed to detecting pits and fragments in large fruits such as peaches, but not in smaller fruits such as cherries or olives or where the processor desires the fruit to remain whole.

U.S. Pat. No. 3,385,434 issued to Nelson on May 28, 1968, describes an apparatus for classifying objects according to their internal structure. The invention uses light beams to view the interior structure of kernels of corn and sort the kernels according to different interior colors, but would not distinguish between a pit in an article of fruit or some other type of variation in internal structure.

An apparatus for detecting seeds in small fruit such as cherries is described in U.S. Pat. No. 3,275,136 issued to Allen et al. on Sept. 27, 1966. In this invention, the pit must be positioned substantially in line with a light source thus, making detection difficult if the pit is off center within the fruit or the fruit is irregularly shaped. Variations in size of the fruit could also make detection difficult.

U.S. Pat. No. 3,768,645 issued to Conway et al. on Oct. 30, 1973, describes a method and apparatus for evaluating articles of produce on the basis of their uniformity and non-uniformity to their transparency to x-rays. U.S. Pat. No. 3,930,994 issued to Conway et al. on Jan. 6, 1976, describes a similar method and apparatus using light rays. In these inventions, the fruit is preoriented which is impractical for high speed evaluation of smaller fruits such as cherries.

U.S. Pat. No. 4,534,470 issued to Mills on Aug. 13, 1985, shows an apparatus and method for processing and sorting fruit as a function of color, blemish, size, shape and other variables by uniformly illuminating the entire surface of the article. The invention does not detect light transmitted through the fruit which would be necessary for detection of pit or internal abnormalities.

U.S. Pat. No. 4,666,045 issued to Gillespie et al. on May 19, 1987, describes a pit detection apparatus and method for detecting the presence of pits or pit fragments in fruit by subjecting the fruit to an optical scanning beam as the fruit passes through an inspection zone. With this invention, the fruit is scanned in only one dimension with a single sweeping scanning beam which could make detection difficult if the pit or pit fragment is not centered in the fruit or attaches to the external surface of the fruit after pitting. In addition, lack of symmetry of shape or discolorations or abnormalities on the surface of the fruit could be mistaken for a pit or cause pits to go undetected. Also, the physical size of the apparatus is impractical for commercial use.

Although the foregoing inventions address some of the various needs of the industry, no single invention is capable of pit detection, and internal and external inspection of an article of produce. These various inventions also have certain sensitivities to size, shape, color, and orientation of the article of produce being inspected. Furthermore, fruit which contains pits which are off-center or pits which remain attached to the surface of the fruit after pitting can pose pit detection errors.

SUMMARY OF THE INVENTION

This invention pertains to a method and apparatus for the non-destructive internal and external inspection of produce, including the detection of pits in various stone fruits. The invention can be used for inspecting stone fruits such as cherries, peaches, apricots, prunes, dates or olives, or for inspecting other non-stone fruits and vegetables.

By way of example and not of limitation, the invention comprises means for transmitting a first plurality of light beams across an inspection zone, means for transmitting a second plurality of light beams across the same inspection zone in a direction which is transverse to the direction of the first plurality of light beams, means for modulating the intensity of the light beams, means for sensing the intensity of each light beam after it passes through the inspection zone, and means for analyzing variations in the intensity of the light beams as an article of produce passes through the inspection zone. As an article of produce passes through the inspection zone along the Z-axis, it is subjected to the light beams which form an X-Y plane. Multiple scans of the article of produce are made as it moves along the Z-axis and, in effect, a three-dimensional "picture" is taken of the article of produce. The data is then analyzed to determine the size of the article of produce along with its light transmission and absorption characteristics. The density of the article of produce or the presence of a pit, internal abnormality or external blemish, is determined by the amount of light passing through the article in three dimensions. The size of the article of produce is depicted by the outer boundaries of the three-dimensional "picture". In a pit detecting mode, after an article of produce which contains an undersired pit passes through the inspection zone the apparatus would send a properly timed signal which would cause a pneumatic valve on a pressurized air manifold to open and the undesired article of produce would be diverted by a blast of air from a directional nozzle coupled to the pneumatic valve.

Quite surprisingly, due to the three-dimensional detection means the invention for detecting a pit in an article of produce can also be used to determine shape, surface defects, density, and other internal and external physical characteristics of the article.

An object of the invention is to inspect an article of produce without damage to the article being inspected.

Another object of the invention is to accurately detect pits in small stone fruits.

Another object of the invention is to inspect an article of produce both internally and externally without regard to size, shape, color, ambient light conditions, or physical orientation.

Another object of the invention is to inspect articles of produce at high speeds.

Another object of the invention is to inspect both the internal and external structure of an article of produce with regard to optical density.

Another object of the invention is to inspect an article of produce in three dimensions.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DESCRIPTION OF THE PREFERRED EMBODIMENTS

Figure 1:
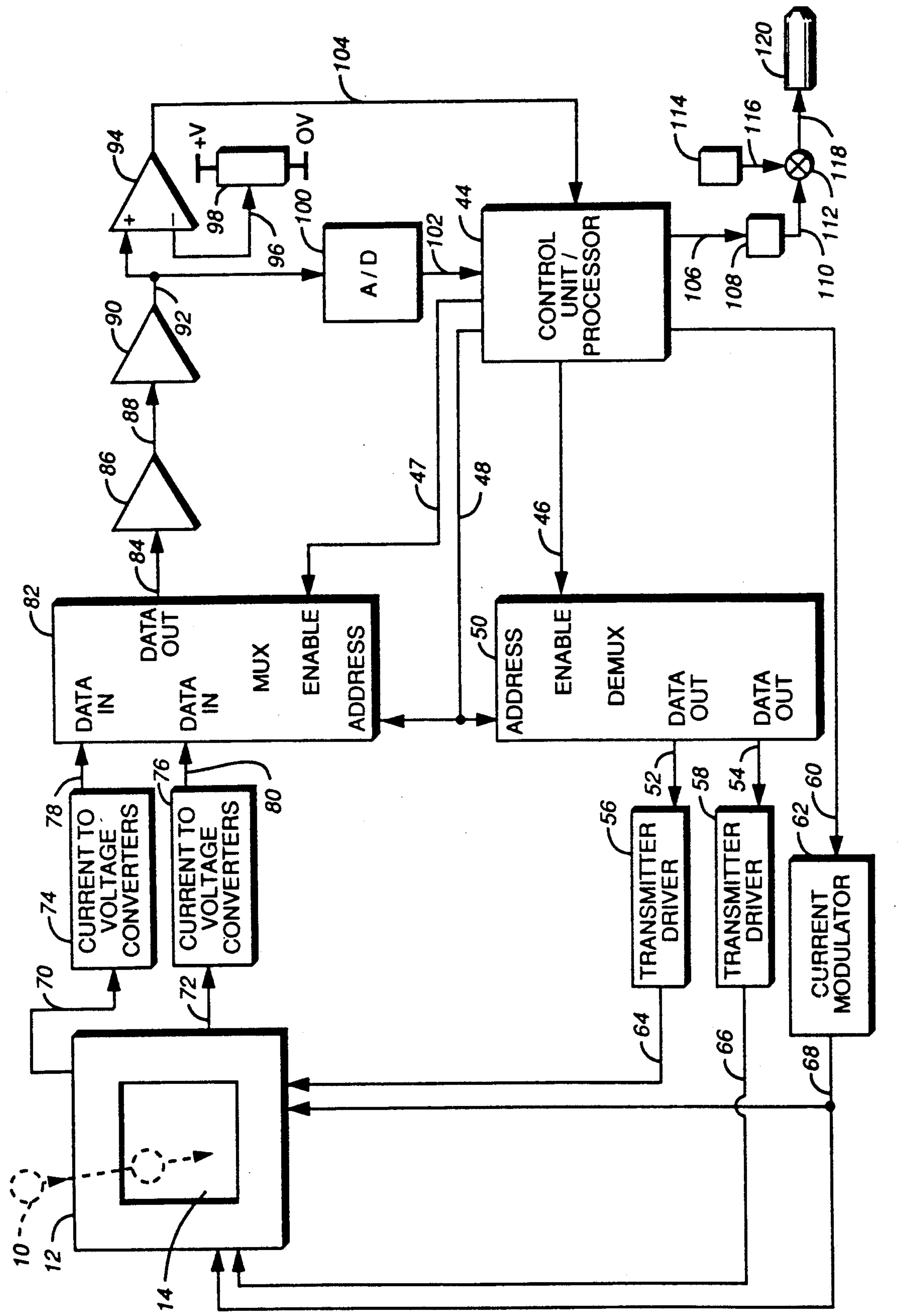
FIG. 1 is a schematic block diagram of the electrical components of one embodiment of the invention.

Referring more specifically to the drawings, for illustrative purposes the present invention is embodied in the apparatus generally shown in FIG. 1. It will be appreciated that the apparatus may vary as to configuration and as to details of the parts without departing from the basic concepts as disclosed herein.

Figure 2:
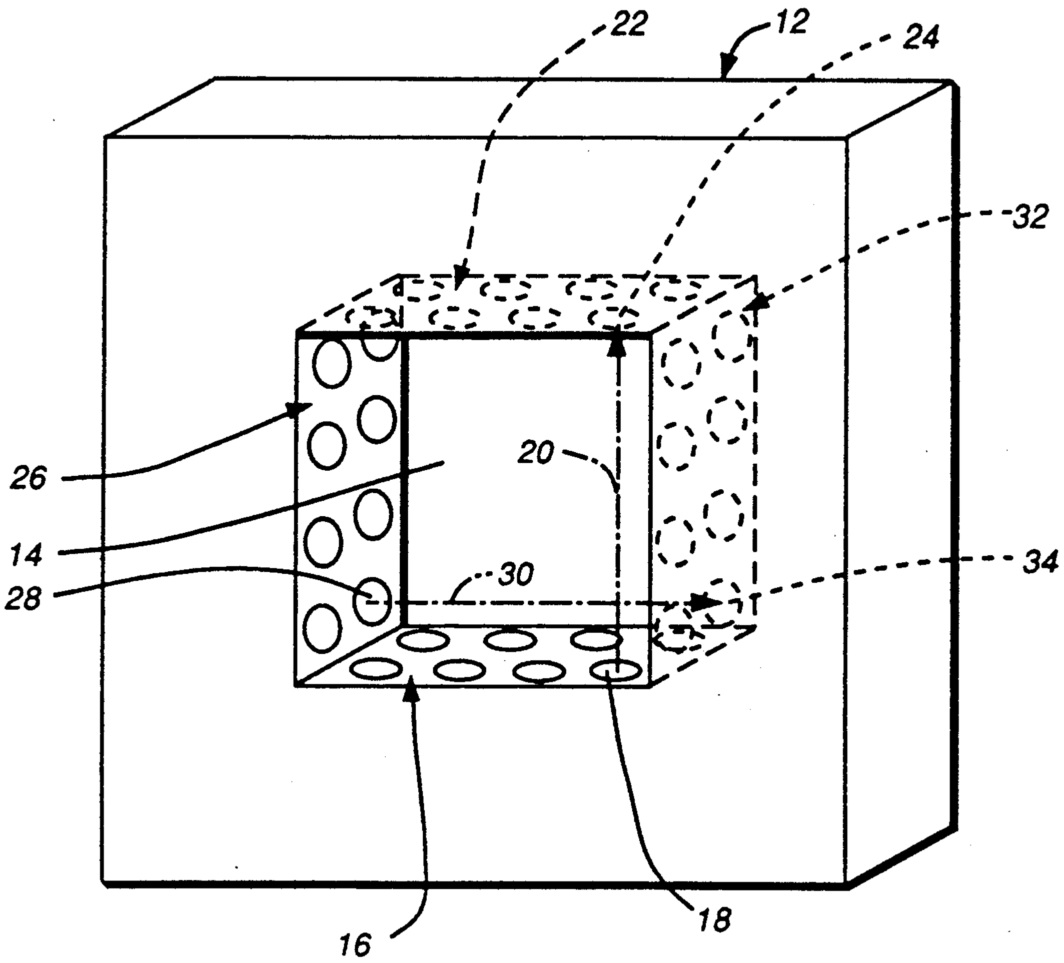
FIG. 2 is a plan view of the transmitter/sensor assembly for the apparatus depicted in FIG. 1.
Figure 3:
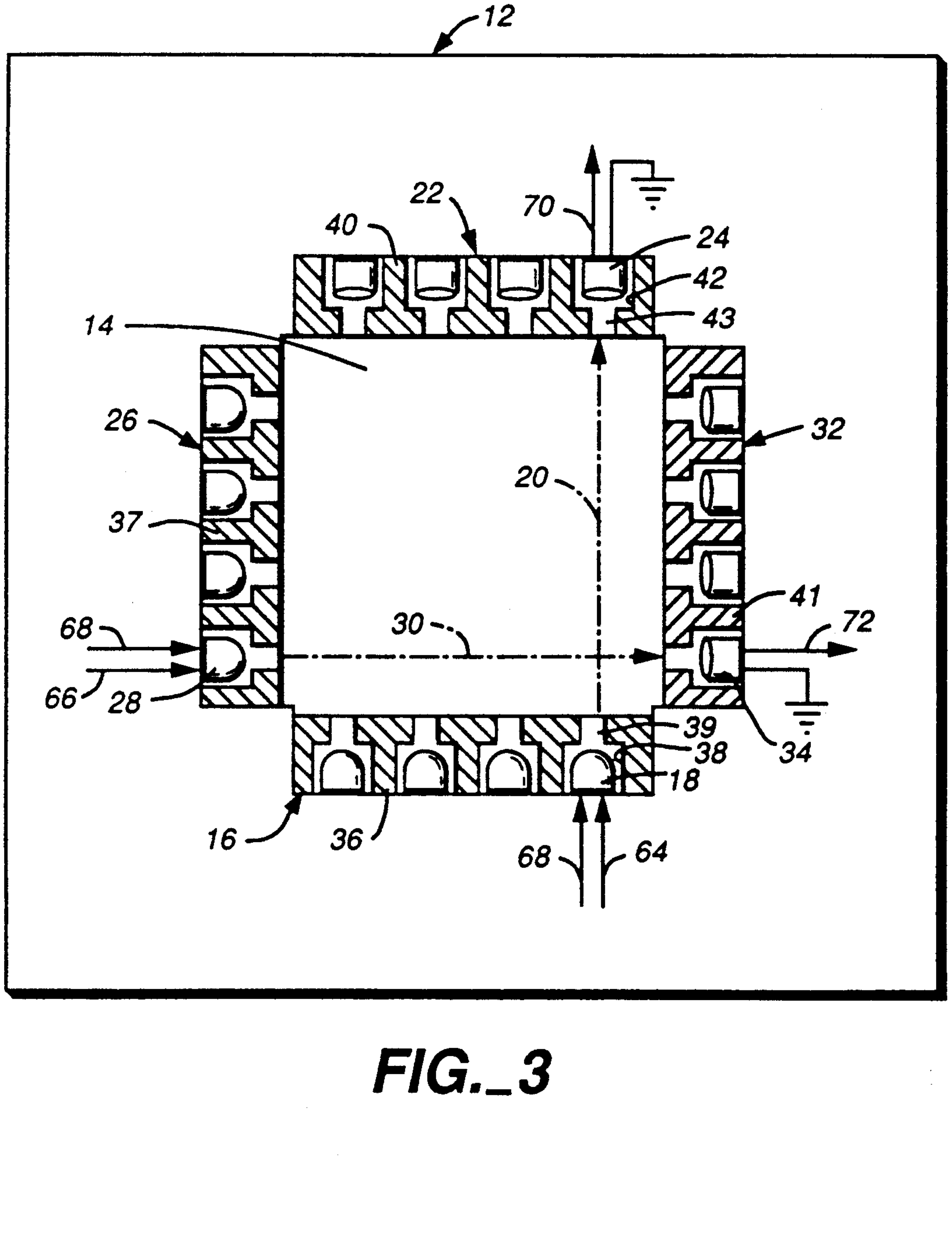
FIG. 3 is a plan view showing internal detail of the transmitter/sensor assembly depicted in FIG. 2.

Referring to FIG. 2 and FIG. 3, transmitter/sensor assembly 12 generally comprises a housing with a square hole in the center. The four inner walls of transmitter/sensor assembly 12 define the boundaries of inspection zone 14. The size of inspection zone 14 is determined by the size of the article of produce 10 to be inspected and is naturally larger than article of produce 10. Rigidly affixed to one of the inner walls in transmitter/sensor assembly 12 is first transmitting means 16 for transmitting a plurality of beams of light across inspection zone 14. Beam of light 20 is representative of one of the plurality of beams of light transmitted by first transmitting means 16. Rigidly affixed to an adjacent inner wall in transmitter/sensor assembly 12 is second transmitting means 26 for transmitting a plurality of beams of light across inspection zone 14 in a direction transverse to the beams of light transmitted by first transmitting means 16. Beam of light 30 is representative of one of the plurality of beams of light transmitted by second transmitting means 26.

Across inspection zone 14 and directly opposite first transmitting means 16 is first sensing means 22 which is rigidly affixed to the corresponding inner wall in transmitter/sensor assembly 12. Across inspection zone 14 and directly opposite second transmitting means 26 is second sensing means 32 which is rigidly affixed to the corresponding inner wall in transmitter/sensor assembly 12.

It should be apparent that each of the four walls in transmitter/sensor assembly 12 which surrounds inspection zone 14 either has a transmitting means or sensing means rigidly affixed to it.

Referring to FIG. 3, first transmitting means 16 comprises a plurality of light sources 18 and second transmitting means 26 comprises a plurality of light sources 28. In the preferred embodiment, these light sources comprise high output infrared emitters where each emitter has an angle of light dispersion of approximately 12 degrees or less. Ideally, the wavelength of the infrared light emitted is in the range of approximately 880 to 940 nanometers. In this embodiment, the infrared emitters produce substantially collimated beams of light which are not susceptible to color differences in article of produce 10.

The number of light sources 18 in first transmitting means 16 and the number of light sources 28 in second transmitting means 26 is determined by the size of inspection zone 14. The light sources are spaced as close together as is possible while still assuring that the beams of light will not overlap. The size of inspection zone 14 is larger than article of produce 10 being inspected. In an embodiment for inspecting cherries, the preferred number of light sources 18 in first transmitting means 16 is eight, each mounted on one-eighth inch centers. There would also be eight light sources 28 in second transmitting means 26, each mounted on one-eighth inch centers.

First sensing means 22 comprises a plurality of light sensors 24 and second sensing means 32 comprises a plurality of light sensors 34. These light sensors produce an output signal proportionate to the intensity of the light sensed. In the preferred embodiment, these light sensors comprise infrared detectors where each detector has an individual lens and a field of vision of approximately twelve degrees or less. Individually lensed detectors with a narrow field of vision will reject ambient light and will further reject light which is scattered when the transmitted beams of light pass through article produce 10. This assures that the sensors only detect the light transmitted from their corresponding light sources.

The number of light sensors 24 in first sensing means 22 corresponds to the number of light sources 18 in first transmitting means 16. The number of light sensors 34 in second sensing means 32 corresponds to the number of light sources 28 in second transmitting means 26.

To further collimate each beam of light 20, first transmitting means 16 further comprises collimating means 36. Collimating means 36 has an insertion hole 38 for each light source 18. Opposite each insertion hole 38 is an exit aperture 39 which has a smaller diameter than the size of its corresponding light source 18. The result is that each beam of light 20 is directed toward its corresponding light sensor 24 as a highly collimated beam of light.

To further reduce detection of ambient and scattered light, first sensing means 22 further comprises filtering means 40. Filtering means 40 has an insertion hole 42 for each light sensor 24. Opposite each insertion hole 42 is an entrance aperture 43 which has a smaller diameter than the size of its corresponding light sensor 24 so that the field of vision is further narrowed.

Each beam of light 30 transmitted from second transmitting means 26 is collimated by a collimating means 37 similar to collimating means 36. Ambient and scattered light is filtered from each light sensor 34 in second sensing means 32 by a filtering means 41 similar to filtering means 40.

Referring to FIG. 2 and FIG. 3, the preferred embodiment for transmitter/sensor assembly 12 is a square configuration so that beams of light transmitted from first transmitting means 16 are parallel with each other and are directly aligned with corresponding light sensors in first sensing means 22. Similarly, beams of light transmitted from second transmitting means 26 are parallel with each other and are directly aligned with corresponding light sensors in second sensing means 32. In this configuration, beams of light 20 transmitted from first transmitting means 16 are also perpendicular to beams of light 30 transmitted from second transmitting means 26. The result is that the beams of light transmitted across inspection zone 14 form an X-Y plane, with the Z-axis being formed by the movement of article of produce 10 through inspection zone 14.

Referring to FIG. 1 and FIG. 3, light sources 18 in first transmitting means 16 are connected to first transmitter driver 56 through interconnections 64. First transmitter driver 56 is a ULNL 2804A or similar device, or a plurality of discrete high current, modulatable driver circuits. First transmitter driver 56 has a number of individual input and output lines at least equal to the number of light sources 18 in first transmitting means 16. First transmitter driver 56 serves to isolate light sources 18 from demultiplexer 50 and to provide sufficient current to activate each light source.

Light sources 28 in second transmitting means 26 are connected to second transmitter driver 58 through interconnections 66. Second transmitter driver 58 is a ULNL 2804A or similar device, or a plurality of discrete high current, modulatable driver circuits. Second transmitter driver 58 has a number of individual input and output lines at least equal to the number of light sources 28 in second transmitting means 26. Second transmitter driver 58 serves to isolate light sources 28 from demultiplexer 50 and to provide sufficient current to activate each light source.

Figure 4:
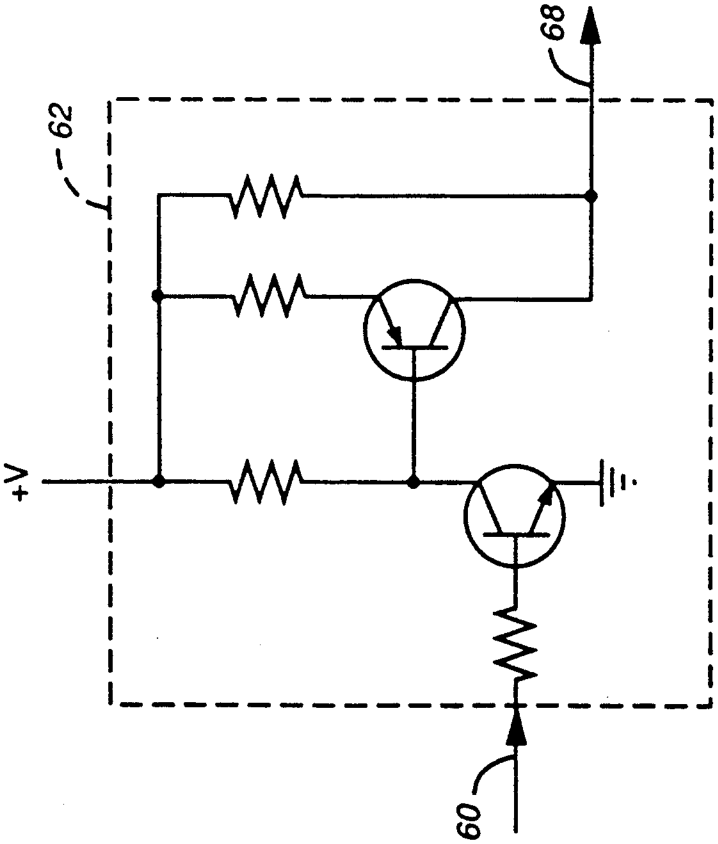
FIG. 4 is a schematic diagram of the current modulator block element for the apparatus depicted in FIG. 1.
Figure 6A:
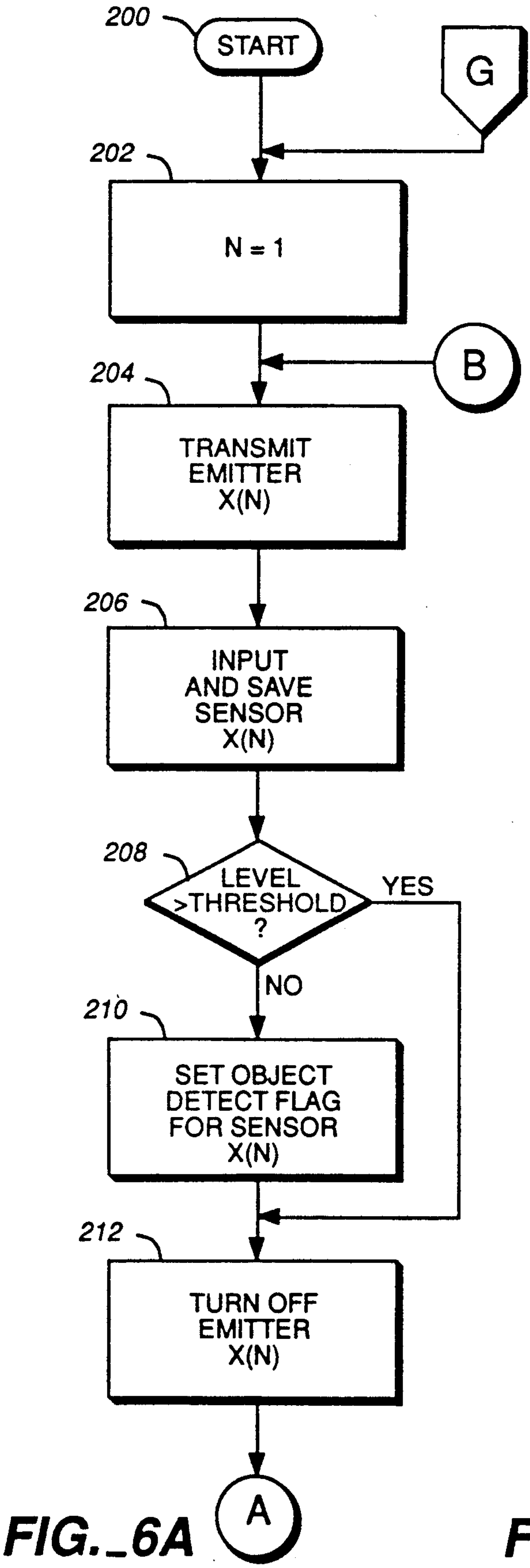
FIGS. 6A-6F are flow charts showing a typical sequence of instructions for use with a digital computer or microcomputer as the control unit/processor for the apparatus depicted in FIG. 1.
Figure 6B:
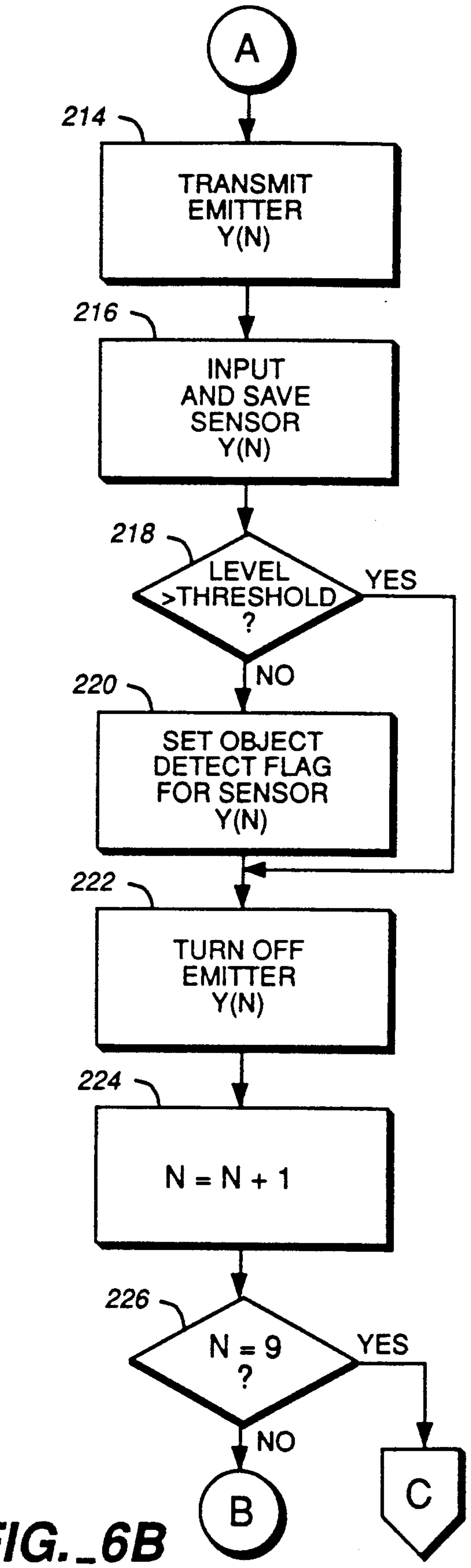
Figure 6C:
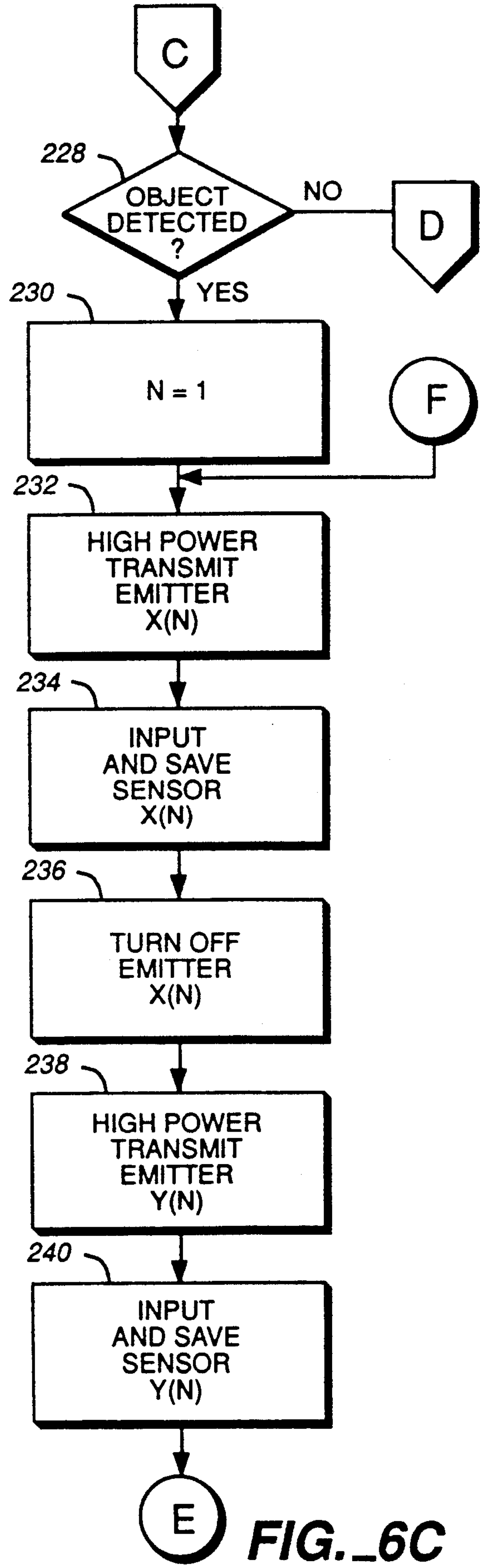
Figure 6D:
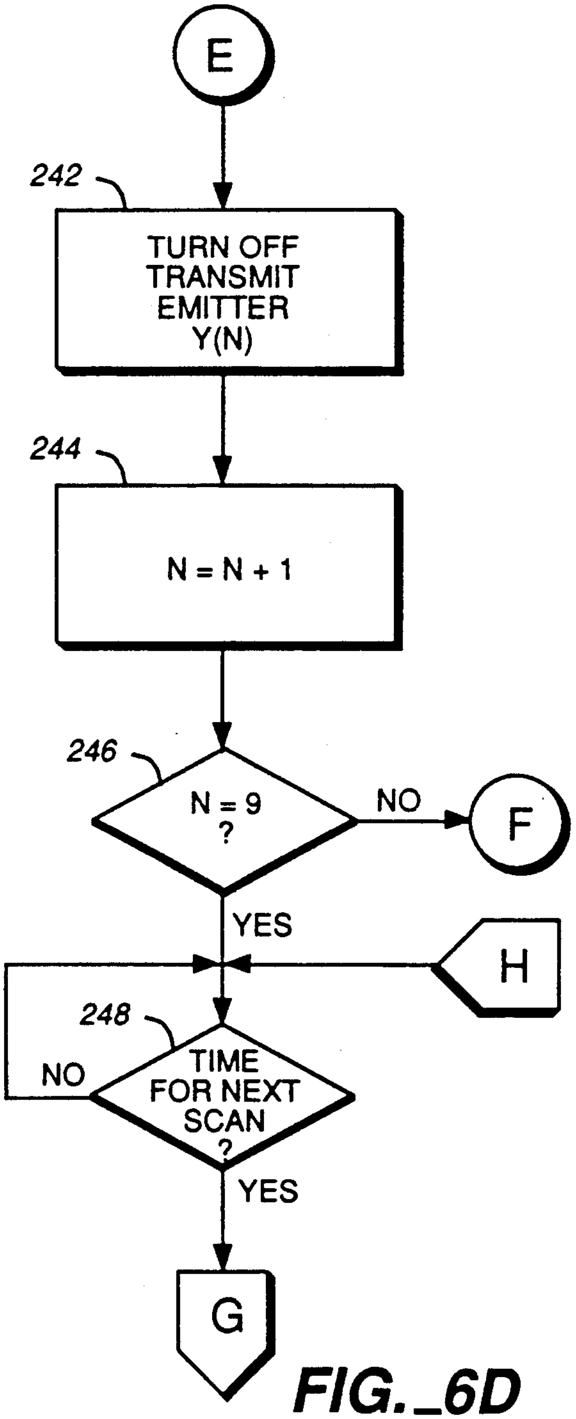
Figure 6E:
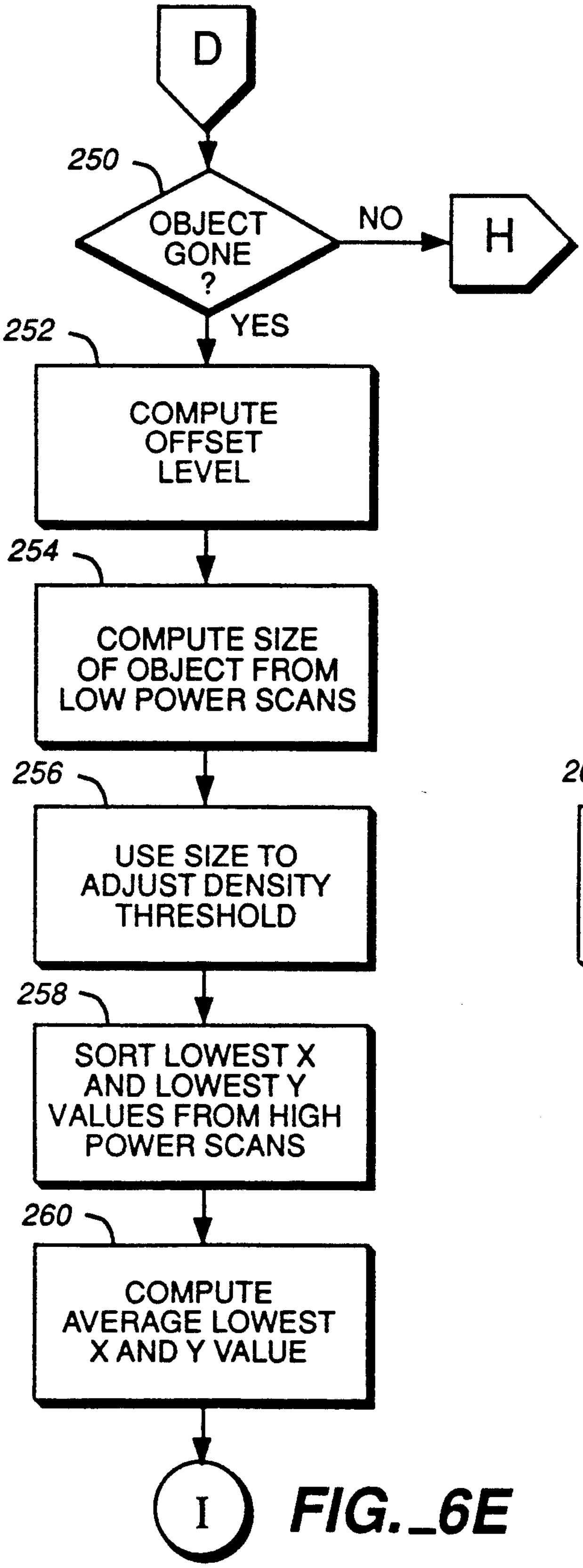
Figure 6F:
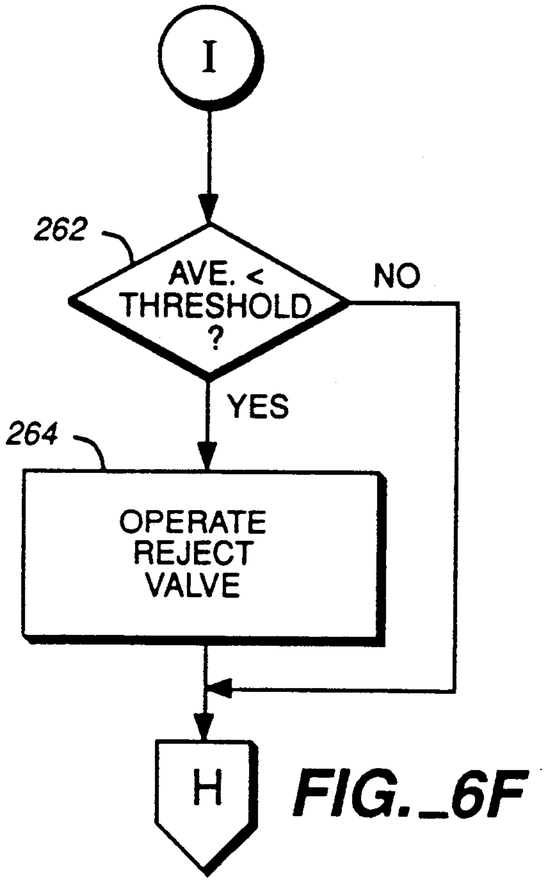

Each light source 18 in first transmitting means 16 and each light source 28 in second transmitting means 26 is connected to current modulator 62 through common interconnection 68. FIG. 4 shows a typical configuration of current modulator 62 as discrete components comprising a discrete current switching circuit which is controlled by control unit/processor 44 through interconnection 60. When current modulator 62 is switched on, the current flow through a light source is increased thereby increasing the intensity of the beam of light it projects.

First transmitter driver 56 is connected to demultiplexer 50 through interconnections 52. Second transmitter driver 58 is connected to demultiplexer 50 through interconnections 54.

Demultiplexer 50 is a 74HC4514EN or similar device, or a circuit comprising discrete components. Demultiplexer 50 has a number of data output lines at least equal to the sum of the number of light sources 18 in first transmitting means 16 and the number of light sources 28 in second transmitting means 26. Demultiplexer 50 is connected to control unit/processor 44 through address lines 48. Demultiplexer 50 has a number of address lines determined by the number of data output lines to be controlled. To control sixteen data output lines with a binary coded address of zero to fifteen, at least four address lines are required. Demultiplexer 50 decodes that address and sends a signal to activate the corresponding light source in first transmitting means 16 or the corresponding light source in second transmitting means 26. This will control which of light source is turned on at any given time to transmit a beam of light across inspection zone 14.

To ensure that light sources in first transmitting means 16 and light sources in second transmitting means 26 are activated only when desired and to protect against continuous high current conditions, demultiplexer 50 also has an enable input connected to control unit/processor 44 through interconnection 46. Demultiplexer 50 will only decode the address sent on interconnections 48 when a an enable signal is sent through interconnection 46.

Figure 5:
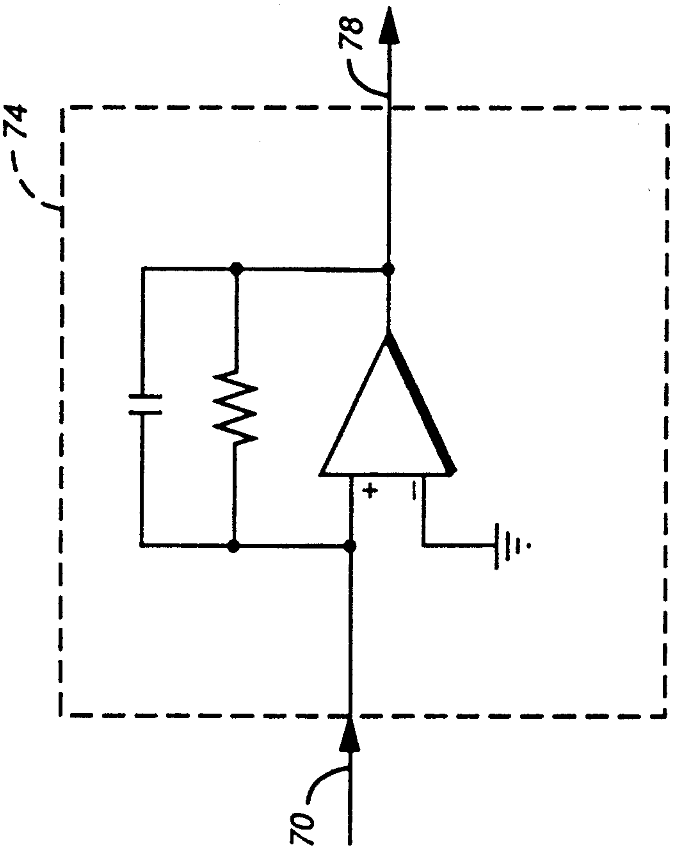
FIG. 5 is a schematic diagram of the current to voltage convertor block element for the apparatus depicted in FIG. 1.

Each light sensor in first sensing means 22 is connected to a separate current to voltage convertor in first plurality of current to voltage convertors 74 through interconnections 70. Each light sensor in second sensing means 32 is connected to a separate current to voltage convertor in second plurality of current to voltage convertors 76 through interconnections 72. FIG. 5 shows a typical configuration of an individual current to voltage convertor using a LF412 ACN or similar device. Discrete components could also be used. These convertors are used to match the output impedance of the light sensors to the input impedance of multiplexer 82 and to act as a first stage of amplification to produce an output level sufficient to drive multiplexer 82.

Multiplexer 82 is a HI3-506 or similar device, or a circuit comprising discrete components. Multiplexer 82 has a number of data input lines at least equal to the sum of the number of light sensors 24 in first sensing means 22 and the number of light sensors 34 in second sensing means 32. Multiplexer 82 is connected to control unit/processor 44 through address lines 48. Multiplexer 82 has a number of address lines determined by the number of data input lines to be controlled. To control sixteen data input lines with a binary coded address of zero to fifteen, at least four address lines are required. Address lines 48 are the same address lines connected to Demultiplexer 50. The same address which is sent to demultiplexer 50 to select a light source is sent by control unit/processor 44 to multiplexer 82. Multiplexer 82 decodes that address and receives data only from the light sensor corresponding to the light source being activated at that time. This is an additional feature to filter, ambient and scattered light because only one sensor is selected at a time.

Individual current to voltage convertors in first plurality of current to voltage convertors 74 are connected to data inputs of multiplexer 82 through interconnections 78. Individual current to voltage convertors in second plurality of current to voltage convertors 76 are connected to data inputs of multiplexer 82 through interconnections 80.

Multiplexer 82 also has an enable input connected to control unit/processor 44 through interconnection 47. Multiplexer 82 will only decode the address sent on interconnections 48 when an enable signal is sent through interconnection 47.

The output of multiplexer 82 is connected to the input of first amplifier 86 through interconnection 84. First amplifier 86 is a conventional operational amplifier such as a 411 ACN or similar device, or a circuit comprising discrete components. The gain of first amplifier 86 is approximately forty. This provides an additional stage of amplification and conditions the data by acting as a low pass filter.

The output of first amplifier 86 is connected to the input of second amplifier 90 through interconnection 88. Second amplifier 90 is a conventional operational amplifier such as a 411 ACN or similar device, or a circuit comprising discrete components. The gain of second amplifier 90 is approximately twenty. This provides an additional stage of amplification and conditions the data by acting as a low pass filter.

The use of successive stages of amplification rather than a high gain single stage provides high gain with low distortion.

The output of second amplifier 90 is connected to the input of analog to digital convertor 100 through interconnection 92. Protection diodes can also be used on the output of amplifier 90 to protect the input of analog to digital convertor 100. Analog to digital convertor 100 is a conventional circuit and is used to convert the amplified and conditioned analog data to digital form. The digital output is proportional to the magnitude of the analog input. The output of analog to digital convertor 100 is connected to an input of control unit/processor 44 through interconnection 102.

The output of second amplifier 90 is also connected to comparator 94 through interconnection 92. Comparator 94 is a standard comparator such as a LM 3302 or similar device operating in the differential mode, or a circuit comprising discrete components. Bias adjustment 98 sets a reference voltage through interconnection 96 to detect the presence of an article of produce 10 in inspection zone 14. The output of comparator 94 is connected to an input of control unit/processor 44 through interconnection 104.

Control unit/processor 44 can be a circuit comprising discrete components or preferably a digital computer or microprocessor. The preferred embodiment uses a 80535/515 microprocessor because of its high speed and compact size.

In a pit detecting or similar accept/reject configuration, control unit/processor 44 is connected to driver 108 through interconnection 106. Driver 108 is a conventional bipolar switch, relay, or other switching device. Driver 108 is connected to air valve 112 through interconnection 110. Air valve 112 is connected to air supply 114 through air line 116. Nozzle 120 is connected to air valve 112 through air line 118.

The method of operation of the apparatus described above and the method of inspecting produce follows by way of example and not of limitation.

Operation starts with control unit/processor 44 initiating a master timing cycle. The master timing cycle repeats itself at the end of approximately one millisecond and is broken in two subperiods. The first subperiod is the scanning period. The second subperiod is the wait period. The length of the scanning subperiod is approximately 700 microseconds. The length of the wait subperiod is approximately one millisecond minus the length of the scanning subperiod.

Control unit/processor 44 initiates a low power scanning cycle by sending a signal to current modulator 62 to operate in its low current mode. As will be explained further, current modulator 62 can also be operated in a high current mode for high power scanning cycles.

Control unit/processor 44 sends a binary coded address to demultiplexer 50 to designate which light source in first transmitting means 16 or second transmitting means 26 is to be activated. The same binary coded address is sent to multiplexer 82 to designate from which light sensor in first sensing means 22 or second sensing means 32 to accept data.

Control unit/processor 44 sends enable signals to demultiplexer 50 and multiplexer. Demultiplexer 50 and multiplexer 82 decode the binary coded address sent by control unit/processor 44 and select the corresponding light source and light sensor.

Assuming the use of eight light sources in first transmitting means 16 and eight light sources in second transmitting means 26, for illustrative purposes individual light sources will be described by using the subscript n ($18_n$ and $28_n$) where n is an incrementing counter. For $n=1$, the corresponding light source $18_n$ in first transmitting means 16 is activated. That light source is then deactivated and the corresponding light source $28_n$ in second transmitting means 26 is activated. That light source is then deactivated and counter n is incremented to $n=n+1$. The corresponding light source $18_n$ in first transmitting means 16 is then activated. That light source is then deactivated and the corresponding light source $28_n$ in second transmitting means 26 is activated. Selection of light sources alternates between light sources in first transmitting means 16 and light sources in second transmitting means 26 until counter $n=9$. At this point all light sources have been activated and the scanning cycle ends.

During a low power scanning cycle, each light source is activated for approximately 20 microseconds. During a high power scanning cycle, each light source is activated for approximately 25 microseconds.

While all light sources in first transmitting means 16 and all light sources in second transmitting means 26 could be activated simultaneously, the preferred method is to select one at a time so that the transmitted light beams do not interfere with each other. Furthermore, while all light sources in first transmitting means 16 could be activated before activating light sources in second transmitting means 26, the preferred method is to alternate between first transmitting means 16 and second transmitting means 26 in the manner described above. The result is to produce a high resolution scan of the entire inspection zone in somewhat of a "circular" manner.

When an individual light source is activated, its corresponding light sensor produces an output current level which is proportional to the intensity of the light beam received. The output current is converted to voltage by the corresponding current to voltage convertor. Multiplexer 82, having received the same address as demultiplexer 50, accepts data only from the current to voltage convertor corresponding to that address. The output of multiplexer 82 is then amplified and conditioned by first amplifier 86 and further amplified and conditioned by second amplifier 90.

The output of second amplifier 90 is then converted into digital data by analog to digital convertor 100. During a low power scanning cycle, control unit/processor 44 stores the data as it is received from comparator 94. During a high power scanning cycle, control unit/processor 44 samples the output of analog to digital convertor 100 multiple times and averages the samples before storing the data. This permits the use of short, high power pulses of light by compensating for rise and fall times of the pulses and cancelling noise in the sensed data.

During the low power scanning cycle, control unit/processor 44 monitors the output of comparator 94. Comparator 94 compares the output of second amplifier 90 against a preset threshold established by bias adjustment 98. When inspection zone 14 is empty, the intensities of the transmitted beams of light do not vary and the output of second amplifier 90 is above the threshold level established by bias adjustment 98.

When article of produce 10 is introduced into the inspection zone 14, it will absorb a portion of the transmitted light beam and the output of second amplifier 90 will decrease. Bias adjustment 98 is set to a level that will allow detection of only the article of produce 14 being inspected and avoid detection of debris or other objects passing through inspection zone 14. Control unit/processor 44 samples the output of comparator 94 while each of light source is activated and stores as additional data which of the corresponding light sensors detected the presence of article of produce 10.

If at the end of the low power scanning cycle control unit/processor 44 detected a decrease in intensity to below the threshold level established by bias adjustment 98, it sends a signal to current modulator 62 to switch from low current mode to high current mode. As a result, the light sources are allowed to draw more current and the intensity of beams of light increases.

The scanning cycle is then repeated, either as a low power scanning cycle or, if an article of produce 14 was detected during the previous low power scanning cycle, as a high power scanning cycle. During a high power scanning cycle, data is collected only from those light sensors which detected the presence of article of produce 10 during the previous low power scanning cycle.

At the end of the scanning subperiod of the master timing cycle, control unit/processor 44 waits before initiating the next scanning cycle. During this period, intermediate processing is performed. Control unit/processor 44 disables demultiplexer 50 and multiplexer 82. When multiplexer 82 is disabled, it is not accepting data. Control unit/processor 44 samples the output of second amplifier 90 and determines the steady state output level which represents noise in the system. This "offset" level is substracted from the data levels that were measured during the scanning cycles. This serves to normalize the data levels measured by eliminating the naturally occurring voltage offset which is inherent to some degree in operational amplifiers.

Additionally, by allowing the light sources to rest before being activated again, power consumption is reduced and the life of the light sources is increased. This is particularly important because it allows the light sources to produce very high intensity beams during the high power scan under a very low duty cycle. The advantage of a high intensity beam of light is that it will penetrate article of produce 10 more readily than a low intensity beam of light. The light sources will also be very reliable and maintain constant light output over the life of the apparatus.

After a high power scanning cycle, the next scanning cycle is a low power scanning cycle. If the presence of article of produce 14 is no longer detected by comparator 94, control unit/processor then processes the data collected from the scanning cycles while it waits for the next article of produce 10 to pass through inspection zone 14.

Data collected during a low power scanning cycle is processed to determine the size of article of produce 10 by comparing the data levels generated from each light sensor as article of produce 10 passed through inspection zone 14. As article of produce 10 passed through inspection zone 14, the output level of some of the light sensors remained constant while others decreased as the result of article of produce 10 being in the path of light sources. By correlating which light sensor outputs remained constant with those that changed, the outer boundaries of article of produce 10 is determined. Since the physical spacing of the light sources and light sensors is a known value, as is the speed of article of produce 10 as it travels along the z-axis, the size, symmetry and position of article of produce 10 in inspection zone 14 can be determined. The size of and symmetry of article of produce 10 can be determined in three dimensions since multiple low power scans are made as article of produce 10 passes through inspection zone 14.

Data collected from a high power scanning cycle is processed to determine the density of article of produce 10. Since data was collected only from lights sensors which detected article of produce 10 during the previous low power scan, the only data processed will be that which represents the light transmittance and absorption characteristics of article of produce 10 and not the areas of inspection zone 14 adjacent to and surrounding article of produce 10. Since higher density is reflected by lower light transmittance and lower sensor output levels, variations in density of article of produce 10 are determined by correlating the variations in sensed data. Light transmittance and absorption characteristics of article of produce 10 can be determined in three dimensions since multiple high power scans are made as article of produce 10 passes through inspection zone 14.

In a pit detection mode, control unit/processor 44 sorts the data collected during the high power scanning cycles to determine the lowest data level from first sensing means 22 and from second sensing means 32. These two data levels represent the highest density area in article of produce 10. Control unit/processor 44 calculates the numerical average of the two data levels and compares it to a threshold which is determined from the size of article of produce 10. Thresholds for various sizes are determined from test data collected for articles of produce which do not contain pits. If the numerical average of the two data levels is lower than the threshold corresponding to the size of article of produce 10, article of produce 10 contains a pit and control unit/processor 44 sends a signal to driver 108 which in turn switches on and actuates air valve 112. Air valve 112 feeds air from air supply 114 to nozzle 120 which in turn blasts air at article of produce 10, thus diverting article of produce 10.

In a defect detection mode, which differs only in the manner in which data is analyzed, control unit/processor 44 sorts the data collected during the high power scanning cycles to determine a group of lowest data levels from first sensing means 22 and a group of lowest data levels from second sensing means 32. Typically each group would consist of the ten lowest data levels for that axis. The data levels are numerically averaged and compared to a threshold which is determined from the size of article of produce 10. Thresholds for various sizes are determined from test data collected for articles of produce which contain defects. It should be apparent that the data level for a defect is not as low as for a pit since a pit has a much higher density. Therefore, by averaging a group of lowest data levels the resulting value will be higher than for the average of the two lowest values taken in the pit detection mode. If the numerical average of the data levels is lower than the threshold corresponding to the size of article of produce 10, article of produce 10 contains a defect and control unit/processor 44 sends a signal to driver 108 which in turn switches on and actuates air valve 112. Air valve 112 feeds air from air supply 114 to nozzle 120 which in turn blasts air at article of produce 10, thus diverting article of produce 10.

FIG. 6 shows a flow chart for the general sequence of instructions that could be used where control unit/processor 44 is a digital computer or microprocessor. While the flow chart is representative of the steps that can be used to accomplish these functions, actual programs embodying these steps can vary.

The sequence begins at step 200 where initialization takes place and the master timing cycle begins.

At step 202, a loop is entered for a low power scan. Counter N is set at an initial value of one. Throughout the scanning process, counter N will represent a variable which is incremented to select a particular light source or sensor to be activated.

At step 204, a loop is entered and the light source in first transmitting means 16 corresponding to the value of counter N is activated.

At step 206, the light sensor in first sensing means 22 corresponding to the value of counter N is activated and the resulting data is input and saved.

At step 208 a loop is entered where the output level from the light sensor is compared against a threshold. If the output level is greater than the threshold value, article of produce 10 has not been detected in inspection zone 14. If the output level is less than the threshold value, article of produce 10 has been detected in the inspection zone and an object detect flag is set for that sensor at step 210.

At step 212, the light source is turned off.

At step 214, the light source in second transmitting means 26 corresponding to the value of counter N is activated.

At step 216, the light sensor in second sensing means 32 corresponding to the value of counter N is activated and the resulting data is input and saved.

At step 218 a loop is entered where the output level from the light sensor is compared against a threshold. If the output level is greater than the threshold value, article of produce 10 has not been detected in inspection zone 14. If the output level is less than the threshold value, article of produce 10 has been detected in inspection zone 14 and an object detect flag is set for that sensor at step 220.

At step 222, the light source is turned off.

At step 224, counter N is incremented by one. The value of counter N is then tested at step 226 to determine if all of the light sources have been selected. For eight light sources in first transmitting means 16 and eight light sources in second transmitting means 26, counter N would be tested against the value nine. If all of the light sources have not been selected, the loop is continued at step 204.

If all of the light sources have been selected, the data collected during the low power scan is tested at step 228 to determine of the object detect flag had been set during the low power scan loop.

If an object detect flag was set during the low power scan loop, the sequence continues at step 230 where counter N is set to the initial value of one. A high power scanning loop is then entered at step 232 and the light source in first transmitting means 16 corresponding to the value of counter N is activated.

If an object detect flag was not set during the low power scan, the sequence jumps to step 250.

At step 234, the light sensor in first sensing means 22 corresponding to the value of counter N is activated and the resulting data is input and saved.

At step 236, the light source is turned off.

At step 238, the light source in second transmitting means 26 corresponding to the value of counter N is activated.

At step 240, the light sensor in second sensing means 32 corresponding to the value of counter N is activated and the resulting data is input and saved.

At step 242, the light source is turned off.

At step 244, counter N is incremented by one. The value of counter N is then tested at step 246 to determine if all of the light sources have been selected. For eight light sources in first transmitting means 16 and eight light sources in second transmitting means 26, counter N would be tested against the value nine. If all of the light sources have not been selected, the loop is continued at step 232.

If all of the light sources have been selected, a loop is entered at step 248 to check the master timing cycle to determine if it is time for the next scan. If it is not time for the next scan, then step 248 is repeated.

If it is time for the next scan, the master timing cycle is reset and the loop for a low power scan is entered at step 202.

If at step 228, it was found that an object detect flag was not set during the low power scan, the sequence continues at step 250 and bypasses steps 230 through 248.

At step 250, the object detect flags are analyzed to determine if article of produce 10 was present in inspection zone 14 during a previous low power scan. If article of produce 10 was not present in inspection zone 14 during a previous low power scan, the sequence continues at step 248 to determine if it is time for the next scan.

If article of produce 10 was present during a previous low power scan but was not present during this low power scan, data collection is complete and the sequence continues at step 252. At step 252, demultiplexer 50 and multiplexer 52 are disabled and, with no data being accepted, the steady state or "offset level" at the output of second amplifier 90 is computed.

At step 254, the size of article of produce 10 is determined, from the data collected during the low power scans.

At step 256, the size of article of produce 10 is used to determine the appropriate density threshold for an article of produce of this size which does not contain a pit.

At step 258, all of the data collected from the high power scans is sorted to determine the lowest data value from first sensing means 22 and the lowest data value from second sensing means 32.

At step 260, the two lowest data values determined during step 258 are numerically averaged.

At step 262, the numerical average determined during step 260 is compared with the density threshold determined during step 256. If the numerical average is less than the density threshold, then article of produce 10 contained a pit and a reject valve is activated at step 264. The sequence then continues at step 248. If the numerical average is greater than the density threshold, then the sequence bypasses step 264 and continues at step 248.

I claim:

1. A method for inspecting an article of produce passing through an inspection zone, comprising the steps of:
- (a) transmitting a first plurality of beams of light along substantially parallel paths across an inspection zone;
- (b) transmitting a second plurality of beams of light along substantially parallel paths across said inspection zone in a direction substantially perpendicular to the direction of said first plurality of beams of light;
- (c) sensing the intensity of each said beam of light after it has passed through said inspection zone;
- (d) repeating steps (a) through (c) multiple times as an article of produce passes through said inspection zone in a direction substantially perpendicular to the plane defined by the paths along which said first and second plurality of beams of light are transmitted; and
- (e) processing the sensed data to determine the light transmittance and absorption characteristics of said article of produce in three dimensions based on variations in intensity of said sensed data, whereby the presence of a pit, defect, abnormality, or other internal or external characteristic of said article of produce is detected.

2. The method as recited in claim 1, further comprising the steps of:
- (a) processing said sensed data to determine the size of said article of produce in three dimensions; and
- (b) comparing said light transmittance and absorption characteristics against a known standard based on said size.

3. The method as recited in claim 1, wherein each of said beams of light comprise highly collimated light rays.

4. The method as recited in claim 1, wherein said beams of light are infrared light.

5. The method as recited in claim 1, wherein each of said beams of light are transmitted sequentially.

6. The method as recited in claim 1, further comprising the steps of:
- (a) alternating between transmitting beams of light in said first plurality of beams of light and beams of light in said second plurality of beams of light; and
- (b) alternating between sensing beams of light in said first plurality of beams of light and sensing beams of light in said second plurality of beams of light.

7. The method as recited in claim 1, further comprising the steps of:
- (a) detecting the presence of said article of produce in said inspection zone; and
- (b) modulating the transmission intensity of said beams of light in response to the presence of said article of produce in said inspection zone.

8. The method as recited in claim 1, further comprising the steps of:
- (a) amplifying and conditioning said sensed data; and
- (b) converting said amplified and conditioned data into digital form.

9. The method as recited in claim 2, further comprising the step of detecting the presence of a pit in said article of produce based on said comparison.

10. The method as recited in claim 2, further comprising the step of detecting the presence of a defect in said article of produce based on said comparison.

11. An apparatus for inspecting an article of produce passing through an inspection zone, comprising:
- (a) first transmitting means for transmitting a first plurality of beams of light along substantially parallel paths across an inspection zone;
- (b) second transmitting means for transmitting a second plurality of beams of light along substantially parallel paths across said inspection zone in a direction substantially perpendicular to the direction of said first plurality of beams of light;
- (c) first sensing means for sensing the intensity of each beam of light in said first plurality of beams of light as each said beam of light passes through said inspection zone;
- (d) second sensing means for sensing the intensity of each beam of light in said second plurality of beams of light as each said beam of light passes through said inspection zone; and
- (e) processing means for processing the sensed data to determine the light transmittance and absorption characteristics of an article of produce in three dimensions based on variations in intensity of said sensed data, said article of produce passing through said inspection zone in a direction substantially perpendicular to the plane defined by the paths along which said first and second plurality of beams of light are transmitted, whereby the presence of a pit, defect, abnormality, or other internal or external characteristic of said article of produce is detected.

12. The apparatus as recited in claim 11, further comprising:
- (a) means for processing said sensed data to determine the size of said article of produce in three dimensions; and
- (b) means for comparing said light transmittance and absorption characteristics against a known standard based on said size.

13. The apparatus as recited in claim 11, further comprising:
- (a) first collimating means for collimating the light rays in each beam of light in said first plurality of beams of light; and (b) second collimating means for collimating the light rays in each beam of light in said second plurality of beams of light.

14. The apparatus as recited in claim 11, wherein:

(a) said first transmitting means comprises a first plurality of infrared emitters;

(b) said second transmitting means comprises a second plurality of infrared emitters;

(c) said first sensing means comprises a first plurality of infrared detectors; and (d) said second sensing means comprises a second plurality of infrared detectors.

15. The apparatus as recited in claim 14, wherein each said infrared emitter has an angle of dispersion of less than approximately twelve degrees.

16. The apparatus as recited in claim 14, wherein each said infrared detector has an acceptance angle of less than approximately twelve degrees.

17. The apparatus as recited in claim 11, further comprising:

(a) means for sequentially transmitting each of said beams of light;

(b) means for sequentially sensing each of said beams of light.

18. The apparatus as recited in claim 11, further comprising:

(a) means for alternating between transmitting beams of light in said first plurality of beams of light and transmitting beams of light in said second plurality of beams of light; and (b) means for alternating between sensing beams of light in said first plurality of beams of light and sensing beams of light in said second plurality of beams of light.

19. The apparatus as recited in claim 11, further comprising:

(a) means for detecting the presence of said article of produce in said inspection zone; and (b) means for modulating the transmission intensity of said beams of light in response to the presence of said article of produce is present in said inspection zone.

20. The apparatus as recited in claim 11, further comprising:

(a) means for amplifying and conditioning said sensed data; and (b) means for converting said amplified and conditioned data into digital form.

21. The apparatus as recited in claim 12, further comprising means for accepting or rejecting said article of produce based on said comparison.

22. The apparatus as recited in claim 11, wherein said processing means comprises a programmed data processor.

* * * * *